United States Patent
Bae

[11] Patent Number: 5,565,639
[45] Date of Patent: Oct. 15, 1996

[54] APPARATUS FOR GIVING MARKS ON USER'S SINGING ABILITY IN KARAOKE

[75] Inventor: Moo H. Bae, Seoul, Rep. of Korea

[73] Assignee: Daewoo Electronics Co., Ltd., Seoul, Rep. of Korea

[21] Appl. No.: 269,383

[22] Filed: Jun. 30, 1994

[30] Foreign Application Priority Data

Jun. 30, 1993 [KR] Rep. of Korea ............ 93-12327

[51] Int. Cl.6 .................................................. G09B 15/02
[52] U.S. Cl. ............................................... 84/477 R
[58] Field of Search .................... 84/601, 602, 609–615, 84/634–638, 477 R, 478

[56] References Cited

U.S. PATENT DOCUMENTS 5,395,123  3/1995  Kondo .............................. 84/615 X Primary Examiner—Stanley J. Witkowski
Attorney, Agent, or Firm—Nixon & Vanderhye P.C.

[57] ABSTRACT

An apparatus for giving marks on user's singing ability in karaoke system uses a cross-correlator. The cross-correlator gives marks on singing ability on the basis of the similarity order between accompaniment signals of karaoke system and user's singing voice signals. The karaoke system can give marks of user's singing ability in consideration of rhythms and musical intervals, and so on, by using the apparatus.

2 Claims, 1 Drawing Sheet

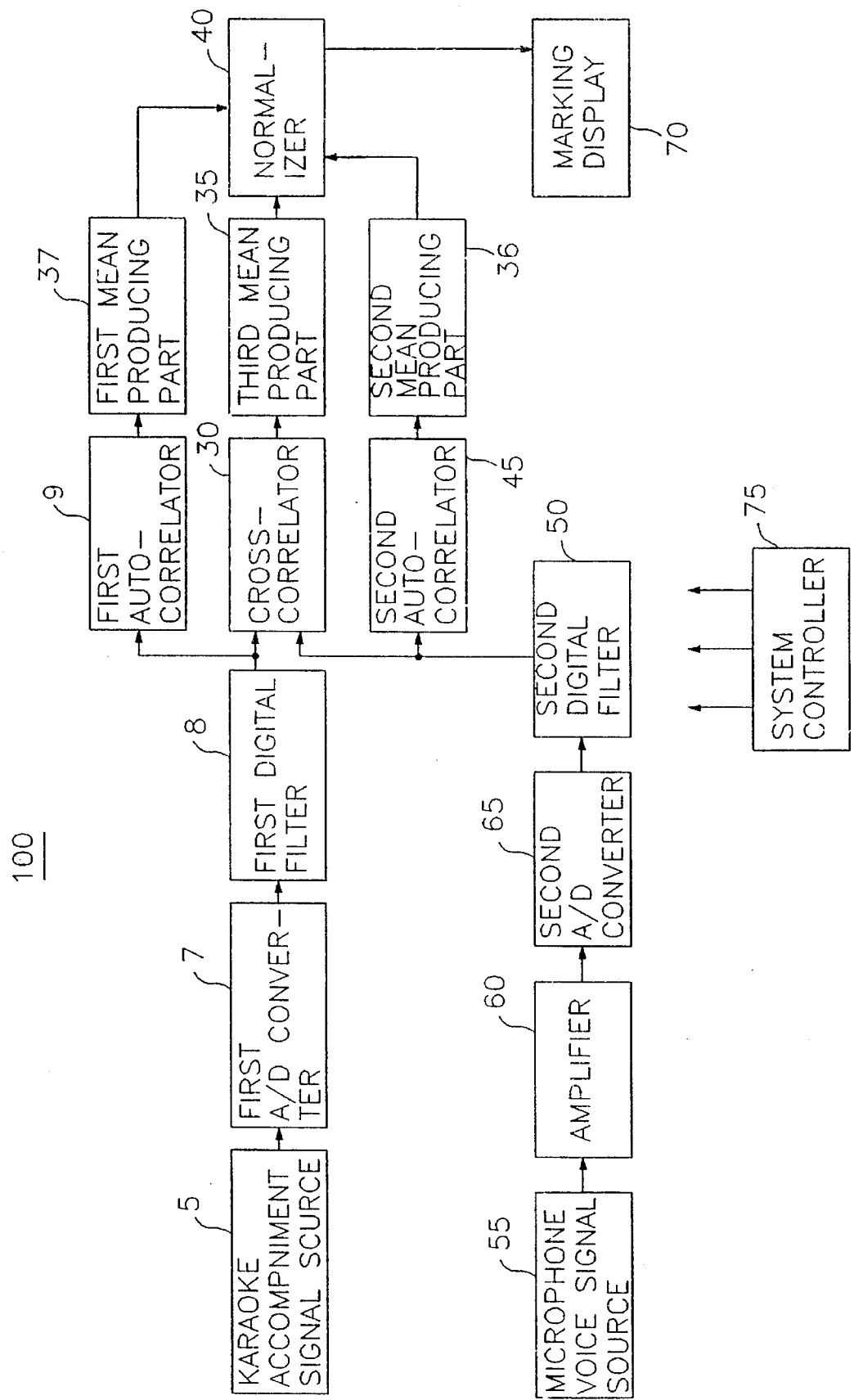

APPARATUS FOR GIVING MARKS ON USER'S SINGING ABILITY IN KARAOKE

BACKGROUND OF THE INVENTION

1. Field of the Invention

The present invention relates to a karaoke system, and more particularly, to an apparatus for giving marks on user's singing ability in karaoke system by using cross-correlator, in which the user's singing ability to a karaoke accompaniment is correctly marked.

2. Prior Arts

In a conventional karaoke system, marking on user's singing ability has been performed incorrectly. For example, a user's singing ability is determined and marked in the karaoke system by attendants hands-clapping sounds, a predetermined marks memorized in karaoke system or random numbers.

Such ways of giving marks in karaoke system has been carried out regardless of user's singing ability, thereby cause a reduction in reliability of singing ability marks.

SUMMARY OF THE INVENTION

It is therefore an object of the present invention to provide an improved apparatus for giving marks on singing ability in karaoke system.

To achieve this object, an apparatus for giving marks on singing ability in karaoke system according to the present invention comprises:

- a first A/D converter for converting first analog signals produced in a karaoke accompaniment signal source into first digital signals;
- a first digital filter for filtering first passband signals among the first digital signals;
- an amplifier for amplifying second analog signals produced in a microphone voice signals source;
- a second A/D converter for converting the amplified second analog signals into second digital signals;
- a second digital filter for filtering second passband signals among the second digital signals;
- a cross-correlator for operating the first pass band signals and the second passband signals in cross-correlation mode to produce a correlated signal;
- a first auto-correlator for operating the first passband signals in an auto-correlation mode to produce first auto-correlated signals;
- a first mean producing part for producing first mean signals from the first auto-correlator;
- a second auto-correlator for operating the second passband signals in an auto-correlation mode to produce second auto-correlated signals;
- a second mean producing part for producing second mean signals from the second auto-correated signals;
- a third mean producing part for producing third mean signals from the cross-correlated signal;
- a normalizer for normalizing said first mean signals, the second mean signals, and the third mean signals to produce a signal for giving the mark.

An apparatus for giving marks on singing ability in karaoke system according to this invention is effective to give marks correctly user's singing ability in consideration of rhythms and musical intervals.

BRIEF DESCRIPTION OF THE DRAWINGS

The above object and other advantages of the present invention will become more apparent by describing in detail a preferred embodiment thereof with reference to the attached drawing in which:

FIG. 1 is a block diagram representing an apparatus for giving marks on singing ability in karaoke system according to an embodiment of the present invention.

DESCRIPTION OF THE PREFERRED EMBODIMENT

Now, the present invention will be explained in details with reference to the accompanying drawings.

FIG. 1 is block diagram representing an apparatus for giving marks on singing ability in karaoke system according to an embodiment of the present invention.

As shown in FIG. 1, karaoke system 100 is stared by system controller 75 which can be adjusted by a karaoke user, using keys on a board representing a select mode such as start, stop, selecting music, etc. Imputing a singing that user wishes to sing to the karaoke using the keys, a karaoke accompaniment signal source 5 produces an accompaniment signals corresponding to user's selecting music that are outputted to a first A/D converter 7. In the first A/D converter 7, the accompaniment signals are converted to first digital signals. The digitalized accompaniment signals are inputted to first digital filter 8. The karaoke accompaniment signal source may include singer's voice signals and accompaniment signals of music instruments.

The first digital filter 8 passes singer's voice signals as far as possible when the accompaniment signals produced from the signal source 5 include singer's voice signals along with the accompaniment signals of the music instruments. However, when they include only signals of the music instruments, first digital filter 8 passes the melody of the music instruments which corresponds to singer's voice signals. The output signals of first digital filter 8 are inputted to auto-correlator 9 and cross-correlator 30. The first digital filter 8 is a signal passband type, to pass the band of 120 Hz to several kHz. It is desirable to vary the passband width of the first digital filter 8 according to singer's voice signal band.

Meanwhile, a microphone voice source 55 to receive user's singing voice to karaoke accompaniment outputs the singing voice signals to amplifier 60. The amplifier 60 amplifies the singing signals, to output to second A/D converter 65. The second A/D converter 65 converts the amplified user's singing signals to second digital signals and then are inputted to second digital filter 50. The second digital filter 50 removes high and low frequency component signals such as hand clapping or noise signals among digitalized user's singing signals coming from A/D converter 65 that are not necessary for giving marks on the singing ability. The second digital filter 50 is similar to the first digital filter 8 in operation characteristic.

First passband signals outputted from the first digital filter 8 are inputted to tint auto-correlator 9, in which the auto-correlation operation is performed for the first passband signals. The operated signals in first auto-correlator 9 are inputted to the normalizer 40. Further, second passband signals outputted from the second digital filter are inputted to second auto-correlator 45, in which the auto-correlation operation is performed for second passband signals. The output signals of the second auto-correlator 45 are inputted to second mean producing part 36. First, second and third mean producing parts 37, 36, 35 operate to obtain the means values for signals from first and second auto-correlatores 9, 45 and for signals outputted from cross-correlator 30, respectively. The obtained mean values output to normalizer 40 which normalizes the values and outputs to a marking display 70 showing user's singing ability as numerical values.

Herein, assuming that output values of first and second auto-correlatores 9, 45 are R(r) and input values are X(t), the R(r) as follows:

$$R(r)=E[X(t)X(t+r)] \qquad (1)$$

Wherein, input values are wide-sense stationary and E is expectation operator.

The cross-correlator 30 received by the outputs of the first and second digital filters 8, 50 performs to correlate the first passband signals and the second passband signals, and then outputs to the third mean producing part 35 to mean these signals. The output signals of the third mean producing part 35 are sent to the normalizer 40. The normalizer 40 calculates user's singing ability marks on the basis of the signals comprising output signals third, second and first mean producing parts 35, 36, 37. For example, operation for giving marks in the normalizer 40 divides the signals received from the third mean producing part 35 by the signals from the second mean producing part 36. The calculated values in normalizer 40 are inputted to user's singing ability marking display 70, to show user's singing ability marks.

Next, the operation of the cross-correlator 30 will be explained in detail.

Giving marks mode according to an embodiment of this invention obtains a similarity order between the accompaniment signals and user's singing signals and determines giving marks for user's singing ability on the basis of the similarity order. For instance, if the similarity is high, user's singing ability is given marks in high score.

The cross-correlation relationship between the accompaniment signals (first passband signals) and the user's singing signals (second passband signals) is expressed as the following formula, assuming that cross-correlation is Rxy(t1, t2) and auto-correlation is Rxx(t1, t2) for given two complex processes X(t), Y(t), $$Rxy(t1,t2)=E[X(t1),Y(t2)] \qquad (2)$$

$$Rxx(t1,t2)=E[X(t1),X(t2)] \qquad (3)$$

Wherein, E represents expectation value, X(t) is signals of professional singer's voice and Y(t) is signals of user's voice.

If X(t) and Y(t) are wide-sense stationary, Rxy(t1, t2) is equal to Rxy(t1–t2) and Rxx(t1, t2) is equal to Rxx(t1–t2).

Generally, when t1–t2 is expressed as r, Rxy(r) and Rxx(r) is substitute for Rxy(t1–t2) and Rxx(t1–t2). Rxy(r) represents the similarity orders between X signals and Y signals. Therefore, it can give marks on user's singing ability using Rxy(r). For example, the greater Rxy(r) become, the higher marks of user's a singing ability become.

If X(t) is same with Y(t), value of Rxy(0) will be great. However, these two signals are not same with each other in practice. To obtain the Rxy(0) for these two signals within short time, Rxy(0) have greater values when the similarity order between user's signals and accompaniment signals is greater.

After obtaining the Rxy(0) several times in one music, it is possible to use mean value of the total Rxy(r) as marks of singing ability. In this case, the marks on user's singing ability will be given in consideration with musical rhythms and pitch.

Karaoke accompaniment signal source 5 may output a signals comprising singer's voice signals and accompaniment signals of musical instruments. In this case, assuming that singer's voice signals are X(t) and accompaniment signals am n(t), the output of karaoke accompaniment signals source 5 expressed as X(t)+n(t). And a cross-correlation relationship formula performed in cross-correlator 30 represents as follows:

$$R(x+n)Y(0)=Rxy(0)+Rny(0) \qquad (4)$$

In general cases, Rny(0) is equal to zero, and there will be no problems to give marks on user's singing ability. In practice, first and second digital filters 8, 50 eliminate n(t) signals having accompaniment signals. That is, band signals which are higher or lower than singer's voice signals such as, cymbals or guitars sound are eliminated by the first and second filters 8,50. Therefore, the operation in cross-correlator 30 is performed easily and results thereof will be more trustful.

When the signals of the karaoke accompaniment signals source 5 have only the accompaniment signals, cross-correlator 30 is performed the operation regarding as X(t) being the signals corresponding to melodies of the accompaniment.

One aspect to be considered when giving marks on user's singing ability is that beside the similarity between X(t) and Y(t), Rxy(0) is proportional to the amplitudes of X(t) and Y(t). The cross-correlator according to an embodiment of this invention use naturally these amplitudes as a criterion for giving mark on singing ability. Hopping to exclude these amplitudes from the criterion, Rxy(0) needs to normalize with Ryy(0) and Rxx(0). That is, because Rxy(0) is proportion to not only the similarity of X and Y signals but also the amplitudes of X and Y signals.

Further, Rxy(0) is effected by phases of X and Y signals. For this reason it is needed to obtain Rxy(0) frequently. Avoiding the problem caused by the phase effect, this invention suggests the cross-correlator efficiently reducing phase effective in which the operation is performed as expressed/Rxy(r) as follows;

$$/Rxy(r) = \sqrt{[E\{X(t) \cdot Y(t+r)\}]^2 + [E\{/X(t) \cdot Y(t+r)\}]^2} \qquad (5)$$

Wherein, t denotes a time, r denotes a delayed time from time t, X(t) denotes a value of the first passband signals at time t, Y(t+r) denotes a value of the second passband signal at time t+r, E denotes an expectation operator, and /X(t) note a Hilbert transform pair of X(t).

The above Hilbert transform is difficult to operate in time domain, but easy to operate in frequency. In this embodiment, Rxy(r) is operated in frequency domain.

Finally, this apparatus for giving marks on singing ability in karaoke system according to the present invention has an effect to increase the reliability for giving marks on singing ability.

It should be understood although preferred embodiments of the invention have been described in detail above, many modifications and variations could be effected therein by one with ordinary skill in the art without departing from the spirit and scope of the invention as defined by the appended claims. For example, the apparatus for giving marks on the singing ability in karaoke system may be applied to automatic language training apparatus that have a function to correct user's pronunciation and so forth.

What is claimed is:

1. An apperatus for giving marks on a user's singing ability in a karaoke system comprising:

a first A/D converter for converting first analog signals produced in a karaoke accompaniment signal source into first digital signals;

a first digital filter for filtering first passband signals among said first digital signals;

an amplifier for amplifying second analog signals produced in a microphone voice signals source;

a second A/D converter for converting the amplified second analog signals into second digital signals;

a second digital filter for filtering second passband signals among said second digital signals;

a cross-correlator for operating the first passband signals and said second passband signals in cross-correlation mode to produce a correlated signal;

a first mean producing part for producing first mean signals from said first correlated signal;

a first auto-correlator for operating said first passband signals in an auto-correlation mode to produce first auto-correlated signals;

a second auto-correlator for operating said second passband signals in an auto-correlation mode to produce second auto-correlated signals;

a second mean producing part for producing second mean signals from said second auto-correlated signals;

a third mean producing part for producing third mean signals from said cross-correlated signals; and a normalizer for normalizing said first mean signals and, said second mean signals and third mean signals to produce a signal for giving marks.

2. The apparatus according to claim 1, wherein said correlated signals expressed as /Rxy(r) outputted from said cross-correlator is obtained by following equation;

$$/Rxy(r) = \sqrt{[E\{X(t) \cdot Y(t+r)\}]^2 + [E\{/X(t) \cdot Y(t+r)\}]^2} \quad (5)$$

Wherein, t denotes a time, r denotes a delayed time from time t, X(t) denotes a value of said first passband signals at time t, Y(t+r) denotes a value of said second passband signal at tiem t+r, E denotes an expectation operator, and /X(t) denote a Hilbert transform pair of X(t).

* * * * *